(12) United States Patent
Brack et al.

(10) Patent No.: US 7,834,125 B2
(45) Date of Patent: Nov. 16, 2010

(54) POLYCARBONATES, COMPOSITIONS MADE THEREFROM, METHODS OF MANUFACTURE THEREOF, AND ARTICLES THEREFROM

(75) Inventors: Hans-Peter Brack, Herrliberg (CH); Dennis Karlik, Bergen op Zoom (NL); Jan-Pleun Lens, Rotterdam (NL); Dennis James Patrick Maria Willemse, Standdaarbuiten (NL); Josef Gerardus Berndsen, Rilland (NL)

(73) Assignee: Sabic Innovative Plastics IP B.V. (NL)

( * ) Notice: Subject to any disclaimer, the term of this patent is extended or adjusted under 35 U.S.C. 154(b) by 25 days.

(21) Appl. No.: 12/338,229

(22) Filed: Dec. 18, 2008

(65) Prior Publication Data

US 2010/0160594 A1 Jun. 24, 2010

(51) Int. Cl.
*C08G 63/00* (2006.01)
*C08G 63/02* (2006.01)

(52) U.S. Cl. ...................... 528/196; 528/198

(58) Field of Classification Search ................. 528/196, 528/198
See application file for complete search history.

(56) References Cited

U.S. PATENT DOCUMENTS

| | | | |
|---|---|---|---|
| 6,117,384 A | 9/2000 | Laurin et al. | |
| 6,458,913 B1 | 10/2002 | Honigfort et al. | |
| 6,657,038 B1 | 12/2003 | Lens et al. | |
| 6,682,805 B1 | 1/2004 | Lilly | |
| 7,115,700 B2 * | 10/2006 | Cella et al. | 528/190 |
| 7,365,149 B2 * | 4/2008 | Brack et al. | 528/196 |
| 7,482,423 B2 * | 1/2009 | Jansen et al. | 528/196 |
| 2007/0100118 A1 | 5/2007 | Chatterjee et al. | |
| 2008/0004379 A1 * | 1/2008 | Berndsen et al. | 524/130 |
| 2008/0004426 A1 | 1/2008 | Brack et al. | |
| 2008/0033108 A1 * | 2/2008 | Kung et al. | 525/67 |

FOREIGN PATENT DOCUMENTS

JP 63010623 1/1988

OTHER PUBLICATIONS

ASTM Designation: D 1003-00, "Standard Test Method for Haze and Luminous Transmittance of Transparent Plastics", pp. 1-6 (2000).
ASTM E 313-00, "Standard Practice for Calculation Yellowness and Whiteness Indices from Instrumentally Measured Color Coordinates", pp. 1-5 (2000).
ASTM Designation: D3418-03, "Standard Test Method for Transition Temperatures and Enthalpies of Fusion and Crystallization of Polymers by differential Scanning Calorimetry", pp. 1-7 (2003).
ASTM Designation: D1004-03, "Standard Test Method for Tear Resistance (Graves Tear) of Plastic Film and Sheeting", pp. 1-4 (2003).
International Standard: ISO 1133, "Plastics-Determination of Properties", pp. 201-252 (1993-1997).
International Standard: ISO 180, "Plastics-Determination of Izod Impact Strength", pp. 1-10 (2000).
International Standard: ISO 527, Parts 1-5, "Plastics-Determination of Properties", pp. 201-252 (1993-1997).

* cited by examiner

*Primary Examiner*—Terressa M Boykin
(74) *Attorney, Agent, or Firm*—Cantor Colburn LLP

(57) ABSTRACT

A melt polymerized polycarbonate comprising repeat units in the polycarbonate derived from the melt polymerization of monomers (II) and/or (III), monomer (IV), and optionally monomer (VIII), wherein monomers (II) and (III) are diaryl dihydroxy compounds, monomer (IV) is a sterically hindered dihydroxy compound, and monomer (VIII) is a non-sterically hindered dihydroxy diaryl compound; wherein the mole ratio of repeat units in the polycarbonate derived from monomers [(II)+(III)]:(IV):(VIII) is 15-70:1-85:0-50, the sum of the mole percent of repeat units in the polycarbonate derived from monomers [(II)+(III)]+(IV) is greater than or equal to 50 mole %, and the sum of the mole percent of units in the polycarbonate derived from monomers [(II)+(III)]+(IV)+(VIII) is 100 mole %; and wherein the polycarbonate has an L* value that is at least 1 L* unit value higher than the same polycarbonate in which monomer (IV) is replaced by bisphenol A.

27 Claims, No Drawings

POLYCARBONATES, COMPOSITIONS MADE THEREFROM, METHODS OF MANUFACTURE THEREOF, AND ARTICLES THEREFROM

BACKGROUND OF THE INVENTION

This disclosure relates to polycarbonates having improved color and compositions comprising the polycarbonates. This disclosure further relates to methods for the manufacture of the polycarbonates and polycarbonate compositions, as well as articles comprising the polycarbonates and polycarbonate compositions.

Polycarbonates having good chemical and/or scratch resistance are useful in the manufacture of articles and components for a wide range of applications, from automobile components, to decorative articles, to housings for electronic appliances such as computers and cell phones. Excellent mechanical properties are also desired in a polycarbonate composition for use in these applications, as well as ease of manufacture.

Polycarbonate copolymers comprising repeat units in the polycarbonate derived from the monoaryl dihydroxy monomers hydroquinone (HQ) and methyl hydroquinone (MeHQ), and the diaryl dihydroxy monomer bisphenol A (BPA) can provide improved chemical and scratch resistance, as disclosed in US Pub. No. 2008/0033108 A1. Although polycarbonates are generally known for their optical clarity and their water-white color, during the synthesis of such polycarbonate copolymers, a reddish/yellow color can be formed. US Pub. No. 2008/0004379 A1 discloses that the color properties of polycarbonate terpolymers made using a melt polymerization process can be improved when using a phosphorus-containing compound, for example, phosphorous acid ($H_3PO_3$). However, it is desired that the color of polycarbonates incorporating both monoaryl and diaryl monomers be still further improved.

SUMMARY OF THE INVENTION

The above needs are met by a melt polymerized polycarbonate comprising repeat units derived from the melt polymerization of monomers (II), (IV), and optionally (VIII), monomers (III), (IV), and optionally (VIII), or monomers (II), (III), (IV), and optionally (VIII), wherein monomer (II) is a first dihydroxy compound of structure:

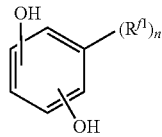
(II)

wherein n is 0 to 4, and each $R^{f1}$ is independently a halogen, a $C_{1-12}$ hydrocarbyl group, or a $C_{1-12}$ halogen substituted hydrocarbyl group;

monomer (III) is a second dihydroxy compound not the same as monomer (II) and of structure:

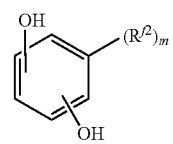
(III)

wherein m is 1 to 4, and $R^{f2}$ is independently a halogen, a $C_{1-12}$ hydrocarbyl group, or a $C_{1-12}$ halogen substituted hydrocarbyl group; and monomer (IV) is a third dihydroxy compound of structure:

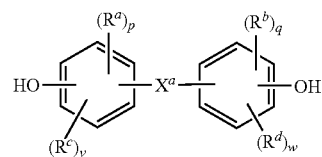
(IV)

wherein $R^a$ and $R^b$ are each independently a halogen or $C_{1-12}$ hydrocarbyl group that is meta to the hydroxy group on the same aromatic ring; $R^c$ and $R^d$ are each independently a $C_1$-$C_{12}$ hydrocarbyl group that is ortho to the hydroxy group on the same aromatic ring; p and q are each independently 0 to 2; v and w are each independently 1 or 2; and $X^a$ is a single bond or a bridging group connecting the two hydroxy-substituted aromatic groups;

monomer (VIII) is a fourth dihydroxy compound of structure:

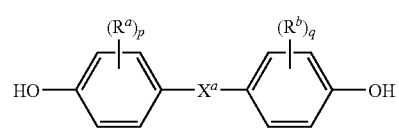
(VIII)

wherein $R^a$ and $R^b$ are each independently a halogen or $C_{1-12}$ hydrocarbyl group that is meta to the hydroxy group on the same aromatic ring; p and q are each independently integers of 0 to 2; and the bridging group $X^a$ is as defined above, wherein the mole ratio of repeat units in the polycarbonate derived from monomers (II):(III) is 0:100 to 100:0, the mole ratio of repeat units in the polycarbonate derived from monomers [(II)+(III)]:(IV):(VIII) is 15-70:1-85:0-50, wherein the mole percent of repeat units in the polycarbonate derived from either monomer (II) or monomer (III), but not both, can be 0, the sum of the mole percent of repeat units in the polycarbonate derived from monomers [(II)+(III)]+(IV) is greater than or equal to 50 mole %, and the sum of the mole percent of units in the polycarbonate derived from monomers [(II)+(III)]+(IV)+(VIII) is 100 mole %; and wherein the polycarbonate has an L* value that is at least 1 L* unit value higher than the same polycarbonate in which monomer (IV) is replaced by bisphenol A.

In another embodiment, a method of manufacture of the above-described polycarbonate comprises melt-polymerizing monomers (II), (IV), and optionally (VIII), monomers (III), (IV), and optionally (VIII), or monomers (II), (III), (IV), and optionally (VIII), wherein with an activated carbonate in the presence of a transesterification catalyst.

Articles comprising the polycarbonates are also described.

The above-described and other features are exemplified by the following detailed description.

DETAILED DESCRIPTION OF THE INVENTION

During the synthesis of polycarbonates derived from dihydroxy monoaryl monomers (such as hydroquinone and methyl hydroquinone) and dihydroxy diaryl monomers (such as bisphenol A), the inventors hereof surprisingly found that the color of the polycarbonates was greatly improved if a dihydroxy diaryl monomer having sterically hindered hydroxy groups was used instead of bisphenol A. This surprising color benefit was found to be very reproducible, and applicable to the manufacture of polymers comprising units derived from dihydroxy monoaryl monomers and dihydroxy diaryl monomers. The polycarbonates further have excellent mechanical properties.

This discovery can be used to improve the color of polycarbonate compositions in place of or in addition to other methods of color improvement. Thus, color improvement can be effected by replacing, in the monomer formulation, some or all of a dihydroxy diaryl monomer having no sterically hindered hydroxy groups, with a sterically hindered dihydroxy diaryl monomer. For example, some or all of a bisphenol A monomer can be replaced in a polycarbonate composition with a sterically hindered dihydroxy diaryl monomer.

"Polycarbonates" as used herein generally means polymers having repeating structural carbonate units of formula (I):

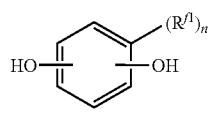

wherein $R^1$ is a residue derived from a dihydroxy compound of the formula HO—$R^1$—OH or chemical equivalent thereof. The compositions disclosed herein comprise polycarbonates that comprises repeat units derived from dihydroxy monomers selected from monomers of formula (II), (III), (IV), and optionally (VIII), each as described below.

Monomer (II) is a first dihydroxy monoaryl compound of the formula (II):

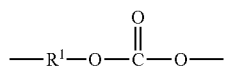

wherein n is 0 to 4, and $R^{f1}$ is a halogen, a $C_{1-10}$ hydrocarbyl group, or a $C_{1-10}$ halogen-substituted hydrocarbyl group. Specifically, n is 0 to 2, and $R^{f1}$ is a halogen, a $C_{1-3}$ hydrocarbyl group, or a $C_{1-3}$ halogen-substituted hydrocarbyl group. More specifically, n is 0 to 1, $R^{f1}$ is a halogen, a $C_{1-3}$ alkyl group, or a $C_{1-3}$ halogen-substituted alkyl group, and the hydroxy groups are in the para position relative to each other. Even more specifically, monomer (II) is hydroquinone, wherein n is 0 and the hydroxy groups are in the para position relative to each other.

Monomer (III) is a second dihydroxy monoaryl compound that is not the same as monomer (II), and is of the formula (III):

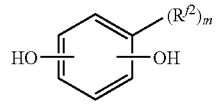

wherein m is 1 to 4, and $R^{f2}$ is a halogen, a $C_{1-10}$ hydrocarbyl group, or a $C_{1-10}$ halogen-substituted hydrocarbyl group. Specifically, m is 1 to 2, and $R^{f2}$ is a halogen, a $C_{1-3}$ hydrocarbyl group, or a $C_{1-3}$ halogen-substituted hydrocarbyl group. More specifically, m is 1, and $R^{f2}$ is a halogen, a $C_{1-3}$ alkyl group, or a $C_{1-3}$ halogen-substituted alkyl group, and the hydroxy groups are in the meta position relative to each other. Even more specifically, monomer (III) is methyl hydroquinone, wherein m is 1, $R^{f2}$ is methyl, and the hydroxy groups are in the para position relative to each other.

Monomer (II) alone, monomer (III) alone, or a combination of monomer (II) and monomer (III) can be used. Thus, the mole ratio of repeat units in the polycarbonate derived from monomers (II):(III) is 0:100 to 100:0, specifically 80:20 to 20:80, and more specifically 60:40 to 40:60. It is also possible to use a combination of two or more different monomers of formula (II), or two more monomers of formula (III), or other combinations.

As shown in the Examples, a polycarbonate comprising units derived from a combination of hydroquinone (monomer (II)) and methyl hydroquinone (monomer (III)) provides good results. Other dihydroxy monoaryl monomers that can be used include resorcinol, 4-bromoresorcinol, ethyl hydroquinone, t-butyl hydroquinone, and the like, as well as combinations comprising at least one of the foregoing dihydroxy monoaryl monomers.

Monomer (IV) is a sterically hindered, dihydroxy diaryl compound of the formula (IV):

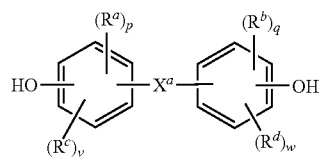

wherein $R^a$ and $R^b$ are each independently a halogen or $C_{1-12}$ hydrocarbyl group that is meta to the hydroxy group on the same aromatic ring; each $R^c$ and $R^d$ are independently a halogen or $C_1$-$C_{12}$ hydrocarbyl group that is ortho to the hydroxy group on the same aromatic ring; p and q are each independently integers of 0 to 2; v and w are each independently integers 1 or 2; and $X^a$ is bridging group connecting the two hydroxy-substituted aromatic groups. $X^a$ can be a single bond, —O—, —S—, —S(O)—, —S(O)$_2$—, —C(O)—, or a $C_{1-18}$ organic group.

Specifically, $X^a$ in monomer (IV) can be a $C_{1-12}$ organic group. Still more specifically, the $C_{1-12}$ organic group can be disposed such that the hydroxy-substituted aromatic groups connected thereto are each connected to a common alkylidene carbon in $X^a$. Further, $X^a$ can be a substituted or unsubstituted $C_{3-18}$ cycloalkylidene, a $C_{1-24}$ alkylidene of formula —C($R^j$)($R^k$)— wherein $R^j$ and $R^k$ are each independently hydrogen, $C_{1-12}$ alkyl, $C_{1-12}$ perfluoroalkyl, $C_{3-12}$ cycloalkyl, $C_{7-12}$ arylalkyl, $C_{1-12}$ heteroalkyl, cyclic $C_{7-12}$ heteroarylalkyl, or a group of the formula —C(=R$^m$)— wherein R$^m$ is a divalent $C_{1-12}$ hydrocarbyl group. In a specific embodiment, X$^a$ is a $C_{1-8}$ alkylidene or cycloalkylidene group.

In another specific embodiment, R$^a$ and R$^b$ are each independently a halogen or $C_{1-12}$ alkyl group, more specifically a $C_{1-3}$ alkyl group that is meta to the hydroxy group on the same aromatic ring; R$^c$ and R$^d$ are each independently a halogen or a $C_{1-3}$ alkyl group that is ortho to the hydroxy group on the same ring; p and q are each independently integers of 0 to 1; v and w are each independently integers of 1 to 2; and X$^a$ is a $C_{1-8}$ alkylidene or cycloalkylidene group.

In a specific embodiment, sterically hindered monomer (IV) is a bisphenol cyclohexylidene in which p and q are each 0, R$^c$ and R$^d$ are each a $C_{1-4}$ alkyl group, v and w are each 1 or 2, specifically 2, and X$^a$ is substituted or unsubstituted cyclohexylidene. In this embodiment, monomer (IV) is a bisphenol cyclohexylidene of formula (V):

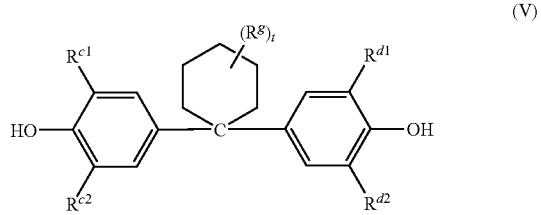

wherein R$^{c1}$ and R$^{d1}$ are each independently $C_{1-12}$ alkyl, R$^{c2}$ and R$^{d2}$ are each independently hydrogen or $C_{1-12}$ alkyl, R$^g$ is $C_{1-12}$ alkyl or halogen, and t is 0 to 10.

More specifically in structure (V), R$^{c1}$ and R$^{d1}$ are each independently $C_{1-4}$ alkyl, R$^{c2}$ and R$^{d2}$ are each hydrogen, R$^g$ is $C_{1-4}$ alkyl, and t is 0 to 5. Still more specifically, monomer (V) is a dimethyl bisphenol cyclohexylidene wherein R$^{c1}$ and R$^{d1}$ are each methyl, R$^{c1}$ and R$^{d1}$ are each hydrogen, and t is 0, i.e., a compound of formula (VI):

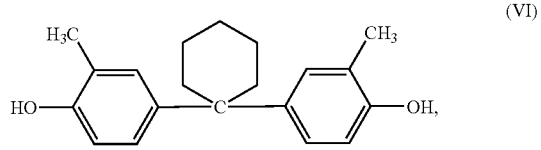

which is also known as dimethyl bisphenol cyclohexane (DMBPC).

In one embodiment, the polycarbonate comprises units derived from monomer (II), monomer (III), or a combination of monomer (II) and monomer (III), and a bisphenol cyclohexylidene of formula (V), specifically of formula (VI). The Examples show that a good combination of properties is obtained when the polycarbonate comprises units derived from hydroquinone, methyl hydroquinone, and dimethyl bisphenol cyclohexane. Optionally, no other monomer is present.

In another embodiment, sterically hindered monomer (IV) is of the formula (VII):

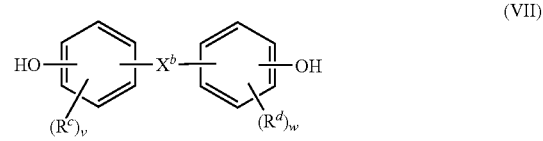

wherein R$^c$ and R$^d$ are each independently a halogen or $C_{1-10}$ alkyl group that is ortho to the hydroxy group on the same aromatic ring; v and w are each independently integers of 1 to 2; and the bridging group X$^b$ is a single bond or a $C_{1-9}$ alkylidene of formula —C(R$^j$)(R$^k$)— wherein R$^j$ and R$^k$ are each independently hydrogen, $C_{1-4}$ alkyl, or $C_{1-4}$ perfluoroalkyl. Specifically, in formula (VII), R$^c$ and R$^d$ are each methyl, v and w are each 1, and X$^b$ is a $C_{1-9}$ alkylidene of formula —C(R$^j$)(R$^k$)— wherein R$^j$ and R$^k$ are each independently hydrogen or $C_{1-4}$ alkyl. Specific examples of sterically hindered monomers (VII) are 4,4'-(1-methyl-ethylidene)bis(2-methyl phenol) (CAS [79-79-0]); 4,4'-(1-methyl-ethylidene)bis(2,6-di-methyl phenol) (CAS [5613-46-7]); 4,4'-methylidene bis(2,6-di-methyl phenol) (CAS [5384-21-4]); and ortho-t-butyl substituted bisphenol A (TMBPA, CAS [60616-94-6]).

Monomer (V) can be used in combination with monomer (VII). The mole ratio of units derived from monomers (V):(VII) can be 5:95 to 95:5, specifically 20:80 to 80:20, still more specifically 70:30 to 30:70. In one embodiment, the mole ratio of units derived from monomers (V):(VII) is 95:5 to 50:50. In another embodiment, monomer (VI) can be used in combination with monomer (VII). The mole ratio of units derived from monomers (VI):(VII) can be 5:95 to 95:5, specifically 20:80 to 80:20, still more specifically 70:30 to 30:70. In one embodiment, the mole ratio of units derived from monomers (VI):(VII) is 95:5 to 50:50.

Specific non-limiting examples of monomer combinations that can be used in the manufacture of polycarbonates comprising units derived from monomers (II) and/or (III) and monomer (IV) include: HQ/DMBPC; MeHQ/DMBPC; t-butyl hydroquinone/DMBPC; HQ/TMBPA; MeHQ/TMBPA; t-butyl hydroquinone/TMBPA; HQ/MeHQ/DMBPC; HQ/resorcinol/DMBPC; HQ/MeHQ/TMBPA; HQ/chlorohydroquinone/DMBPC; HQ/trimethyl hydroquinone/DMBPC; and HQ/t-butyl hydroquinone/DMBPC. Optionally, no other monomer is present in addition to the named monomers in the foregoing combinations.

Optionally, a non-sterically hindered monomer can used in addition to the sterically hindered monomer (IV) in the manufacture of the polycarbonate, in particular a dihydroxy diaryl compound of formula (VIII):

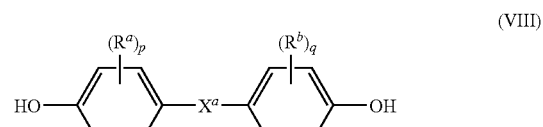

wherein R$^a$, R$^b$, X$^a$, p and q are as defined above; specifically wherein R$^a$ and R$^b$ are each independently a $C_{1-12}$ alkyl group, p and q are each independently integers of 0 to 1, and the bridging, and X$^a$ is a $C_{1-8}$ alkylidene of formula —C(R$^j$)

($R^k$)—wherein $R^j$ and $R^k$ are each independently hydrogen or $C_{1-4}$ alkyl. Specifically in formula (VIII), $R^a$ and $R^b$ are each a $C_{1-3}$ alkyl group (more specifically methyl), p and q are each 1, and $X^a$ is isopropylidene. In one embodiment, monomer (VIII) is 2,2-bis(4-hydroxyphenyl)propane (bisphenol A), wherein p and q are each 0 and $X^a$ is isopropylidene.

Some illustrative non-limiting examples of monomer (VIII) include the following: 1,1-bis(4-hydroxyphenyl)methane, 1,1-bis(4-hydroxyphenyl)ethane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)-n-butane, 2,2-bis(4-hydroxy-1-methylphenyl)propane, 4,4'-dihydroxybiphenyl, bis(4-hydroxyphenyl)methane, bis(4-hydroxyphenyl)diphenylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 1,1-dichloro-2,2-bis(4-hydroxyphenyl)ethylene, 1,1-dibromo-2,2-bis(4-hydroxyphenyl)ethylene, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2-phenyl-3,3-bis-(4-hydroxyphenyl) phthalimidine (PPPBP), 2,2-bis(4-hydroxy-3-bromophenyl)propane, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(5-phenoxy-4-hydroxyphenyl)ethylene, as well as combinations comprising at least one of the foregoing dihydroxy diaryl compounds.

In a specific embodiment, the polycarbonate comprises units derived from monomer (II) or monomer (III), a bisphenol cyclohexylidene of formula (V), and monomer (VIII). In another specific embodiment, the polycarbonate comprises units derived from monomer (II) and monomer (III), a bisphenol cyclohexylidene of formula (V), and monomer (VIII). In still another specific embodiment, the polycarbonate comprises units derived from monomer (II) or monomer (III), DMBPC, and bisphenol A. In still another specific embodiment, the polycarbonate comprises units derived from monomer (II) and monomer (III), DMBPC, and bisphenol A.

The Examples show that a good combination of properties is obtained when the polycarbonate comprises units derived from hydroquinone, methyl hydroquinone, dimethyl bisphenol cyclohexane, and bisphenol A (HQ/MeHQ/DMBPC/BPA). Optionally, no other monomer is present in addition to HQ/MeHQ/DMBPC/BPA. In another specific embodiment, the polycarbonate comprises units derived from monomer (II), monomer (III), and a t-butyl substituted bisphenol A of formula (VII) wherein $R^c$ and $R^d$ are each a t-butyl is ortho to the hydroxy group on the same aromatic ring; v and w are each 1, and $X^a$ is isopropylidene, and monomer (VIII). The Examples also show that a good combination of properties is obtained when the polycarbonate comprises units derived from hydroquinone, methyl hydroquinone, dimethyl bisphenol cyclohexane, and bisphenol A (HQ/MeHQ/TMBPA/BPA). Optionally, no other monomer is present in addition to HQ/MeHQ/TMBPA/BPA. Other non-limiting examples of specific monomer combinations that can be used in the manufacture of polycarbonates derived from monomers (II) and/or (III), (IV), and (VIII) include: HQ/MeHQ/DMBPC/BPA; HQ/MeHQ/TMBPA/BPA; HQ/MeHQ/DMBPC/PPPBP; HQ/MeHQ/DMBPC/1,1-bis(4-hydroxyphenyl)-3,3,5-trimethylcyclohexane (BPI); HQ/resorcinol/DMBPC/BPA; HQ/chlorohydroquinone/DMBPC/BPA; HQ/trimethyl hydroquinone/DMBPC/BPA; and HQ/t-butyl hydroquinone/DMBPC/BPA. Optionally, no other monomer is present in addition to the named monomers in the foregoing combinations.

The moles of the repeat units in the polycarbonate that are derived from monomers [(II)+(III)] is greater than or equal to 15 mole %, specifically 15-70 mole %, more specifically 30-70 mole %, even more specifically 45-70 mole %, still more specifically 55-70 mole %, wherein the mole % of either monomer (II) or monomer (III), but not both, can be 0. Specifically, the mole ratio of repeat units in the polycarbonate derived from monomers [(II)+(III)]:(IV):(VIII) is 15-70:1-85:0-50, wherein the sum of the mole percent of repeat units in the polycarbonate derived from monomers [(II)+(III)]+(IV) is greater than or equal to 50 mole %, and the sum of the mole percent of repeat units in the polycarbonate derived from monomers [(II)+(III)]+(IV)+(VIII) is 100 mole %. More specifically, the mole ratio of repeat units in the polycarbonate derived from monomers [(II)+(III)]:(IV):(VIII) is 30-70:1-70:0-50, wherein the sum of the mole percent of repeat units in the polycarbonate derived from monomers [(II)+(III)]+(IV) is greater than or equal to 50 mole %, and the sum of the mole percent of repeat units in the polycarbonate derived from monomers [(II)+(III)]+(IV)+(VIII) is 100 mole %. Even more specifically, the mole ratio of repeat units in the polycarbonate derived from monomers [(II)+(III)]:(IV):(VIII)] is 45-70:5-70:0-30, wherein the sum of the mole percent of repeat units in the polycarbonate derived from monomers [(II)+(III)]+(IV) is greater than or equal to 60 mole %, and the sum of the mole percent of repeat units in the polycarbonate derived from monomers [(II)+(III)]+(IV)+(VIII) is 100 mole %. Still more specifically, the mole ratio of repeat units in the polycarbonate derived from monomers [(II)+(III)]:(IV):(VIII) is 55-70:10-50:0-25, wherein the sum of the mole percent of repeat units in the polycarbonate derived from monomers [(II)+(III)]+(IV) is greater than or equal to 60 mole %, and the sum of the mole percent of repeat units in the polycarbonate derived from monomers [(II)+(III)]+(IV)+(VIII) is 100 mole %.

In a specific embodiment, the mole ratio of repeat units in the polycarbonate derived from monomers [(II)+(III)]:(IV) is 15-70:30-85, more specifically 45-70:30-55, still more specifically 55-70:30-45, and even more specifically 60-70:30-40, each wherein the sum of the mole percent of units in the polycarbonate derived from monomers [(II)+(III)]+(IV) is 100 mole %. In the foregoing mole ratios, either monomer (II) or monomer (III) can be present in an amount of 0 mole %, provided that at least one of monomer (II) and (III) is present.

In another specific embodiment, the mole ratio of repeat units in the polycarbonate derived from monomers [(II)+(III)]:(IV):(VIII) is 15-70:1-69:1-50, wherein the sum of the mole percent of repeat units in the polycarbonate derived from monomers (II)+(III)+(IV) is greater than or equal to 50 mole %, and the sum of the mole percent of repeat units in the polycarbonate derived from monomers [(II)+(III)]+(IV)+(VIII) is 100 mole %. Alternatively, the mole ratio of repeat units in the polycarbonate derived from monomers [(II)+

(III)]:(IV):(VIII) is 30-70:1-69:1-50, wherein the sum of the mole percent of repeat units in the polycarbonate derived from monomers (II)+(III)+(IV) is greater than or equal to 50 mole %, and the sum of the mole percent of repeat units in the polycarbonate derived from monomers [(II)+(III)]+(IV)+(VIII) is 100 mole %. More specifically, the mole ratio of repeat units in the polycarbonate derived from monomers [(II)+(III)]:(IV):(VIII)] is 45-70:5-50:5-50, wherein the sum of the mole percent derived from monomers [(I)+(III)]+(IV) is greater than or equal to 60 mole %, and the sum of the mole percent derived from monomers [(II)+(III)]+(IV)+(VIII) is 100 mole %. Still more specifically, the mole ratio of repeat units in the polycarbonate derived from monomers [(II)+(III)]:(IV):(VIII)] is 55-70:8-30:10-30, wherein the sum of the mole percent derived from monomers [(II)+(III)]+(IV) is greater than or equal to 60 mole %, and the sum of the mole percent derived from monomers [(II)+(III)]+(IV)+(VIII) is 100 mole %. Again, it is to be understood that in the foregoing mole ratios, units derived from either monomer (II) or monomer (III) can be present in an amount of 0 mole %, provided that at least one of monomer (II) and (III) is used.

The polycarbonates disclosed herein are manufactured using melt processes. Generally, melt polymerized polycarbonates are prepared by co-reacting, in a molten state, the dihydroxy monomers (II), (III), (IV) and optionally (VIII) with an activated diaryl carbonate ester (e.g., bis(methylsalicyl) carbonate (BMSC)) in the presence of a transesterification catalyst. Reaction can occur in a Banbury® mixer, twin screw extruder, or the like, to form a uniform dispersion. Volatile monohydric phenol is removed from the molten reactants by distillation and the polymer is isolated as a molten residue. Among the phase transfer catalysts that can be used are catalysts of the formula $(R^3)_4Q^+Y^-$, wherein each $R^3$ is the same or different, and is a $C_{1-10}$ alkyl group; Q is a nitrogen or phosphorus atom; and Y is a halogen atom or a $C_{1-8}$ alkoxy group or $C_{6-18}$ aryloxy group. Useful phase transfer catalysts include, for example, $[CH_3(CH_2)_3]_4N^+Y^-$, $[CH_3(CH_2)_3]_4P^+Y^-$, $[CH_3(CH_2)_5]_4N^+Y^-$, $[CH_3(CH_2)_6]_4N^+Y^-$, $[CH_3(CH_2)_4]_4NY^-$, $CH_3[CH_3(CH_2)_3]_3N^+Y^-$, and $CH_3[CH_3(CH_2)_2]_3N^+Y^-$, wherein Y is $Cl^-$, $Br^-$, a $C_{1-8}$ alkoxy group or a $C_{6-18}$ aryloxy group.

Branched polycarbonate blocks can also be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Mixtures comprising linear polycarbonates and branched polycarbonates can be used.

A chain stopper (also referred to as an endcapping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates.

The polycarbonate is amorphous and can have a molecular weight of 20,000 to 130,000, specifically 30,000 to 80,000, based on polystyrene standards, more specifically a molecular weight of 32,000 to 63,000 g/mole, based on polystyrene standards. As used herein, "amorphous" means having a glass-like structure with low degree of order and no crystallinity as determined by lack of a melting endotherm when analyzed by differential scanning calorimetry (DSC) (such as by ASTM D3418 or ISO 11357).

Manufacture can be conducted as either a batch or a continuous process. In batch production processes, the mole percent of repeat units in the polycarbonate derived from monomers (II), (III), (IV), and (VIII) are based on the moles of each monomer used in the batch manufacture, assuming that each monomer is incorporated into the polycarbonate with 100% efficiency. In continuous production processes, the mole percent of repeat units in the polycarbonate derived from monomers (II), (III), (IV), and (VIII) are based on the flow rates of monomers and/or on-line measurement, e.g., near infrared spectroscopy or on-line Raman spectroscopy.

Alternatively, the mole percent of repeat units in the polycarbonate derived from monomers (II), (III), (IV), and (VIII) can be determined based on analysis of the polycarbonate, by either spectroscopic methods or by total hydrolysis of a polymer followed by analysis of the various constituent units, for example by high pressure liquid chromatography (HPLC) or spectroscopic methods. Spectroscopic methods include vibrational spectroscopy such as infrared or Raman spectroscopy and nuclear magnetic resonance (NMR) spectroscopy, for example by $^1H$ NMR spectroscopy, or a combination of $^1H$ NMR and $^{13}C$ NMR spectroscopy. Such methods and their application to the qualitative and quantitative analysis of polymers are described in more detail in "Spectroscopy of Polymers" by J. Koenig (ISBN 0-8412-1904-4) and "Modern Polymer Spectroscopy" by G. Zerbi (ISBN 3527296557). Of these methods, NMR spectroscopy is preferred because it often allows unambiguous structural assignment. Various aspects in obtaining and interpreting NMR spectra of polymers are described in more detail in "NMR Spectroscopy of Polymers," edited by R. N. Ibbett (ISBN 075140005X), "NMR Spectra of Polymers and Polymer Additives" by A. J. Brandolini and D. D. Hills (ISBN 0824789709), "NMR Spectroscopy of Polymers" by K. Hatada and T. Kitayama (ISBN 3540402209), and "Instrumental Analysis" by G. D. Christian and J. E. O'Reilly (ISBN 0-205-08640-3).

In the NMR analysis of type and content of the repeat units in the polycarbonate derived from monomers (II), (III), (IV), and (VIII), both $^1H$ NMR and $^{13}C$ NMR can be used, but $^1H$ NMR is preferred because of its greater sensitivity and ease of use for quantitative analysis. When the identity of each of the monomers are known and each repeat unit derived from that monomer contains at least one proton that is distinct and distinguishable in the $^1H$ NMR spectrum from the other repeat units, the integrated resonances of the various repeat units in the $^1H$-NMR can be used in order to calculate the molar amount of each repeat unit present. One skilled in the art will recognize the need for the use of either an internal standard for the quantitative analysis or the use of a chemometric software calibration program. In addition, one skilled in the art will understand that various standard corrections may need to be applied in this analysis, for example, correcting for any differences in the relative number of protons whose intensities have been integrated for each type of repeat unit. When the polymer to be analyzed contains repeat units that do not have distinguishable protons, $^{13}C$-NMR can be used. In addition, NMR will not always readily distinguish between functional groups in the polymer versus those in some residual species. One skilled in the art will understand that in this case, residual analyses can be conducted and then a correction to the NMR data can be made. Alternatively the polymer can be purified, for example, by precipitation to remove any residual species prior to NMR analysis.

Without wishing to be bound to a particular mechanism, it is theorized that the hydroxy groups in dihydroxy monoaryl monomers (monomers (II) and (III)) are sensitive to oxidative degradation, and thus are a likely source of color bodies during the melt polymerization, resulting in a reddish/yellow tint that can be formed during polycarbonate manufacture. Further without wishing to be bound to a particular mechanism, it is theorized that, due to steric hindrance arising from the one or more substituted groups at the ortho position of monomer (IV), the reactivity of monomer (IV) with the activated carbonate ester is lower than that of dihydroxy diaryl compounds of formula (VIII) (such as bisphenol A). Kinetic experiments show that derivatization of the hydroxyl groups of the monoaryl monomers is favored over those of the sterically hindered diaryl monomer (IV). This may result in lower concentrations of free monoaryl monomers, and thus lower levels of oxidative degradation reactions during the melt polymerization, with improved color as a result.

In general, larger substituents, e.g. t-butyl versus methyl, or more substituents, e.g., both ortho positions substituted instead of one, can further decrease the reactivity of the sterically hindered monomer (IV), and thus improve color. In other embodiments, other substituents (other than alkyl groups) can be used to decrease the reactivity of the diaryl monomers. For example, in one embodiment, electron-withdrawing substituents known in the art at the ortho or para position(s) can reduce the rate of reaction of the dihydroxy diaryl monomers. In another embodiment, an alkyl dihydroxy compound is used in place of the non-sterically hindered dihydroxy diaryl compound.

The color and color stability improvement can increase with increasing content of the sterically hindered monomer (IV). The color and color stability improvement is often the greatest upon initial substitution of a non-hindered monomer (VIII) with a sterically hindered monomer (IV). Further increases in the content of the sterically hindered monomer (IV) continue to provide additional benefit, but the magnitude of the additional benefit can decrease with further increases in the content of the sterically hindered monomer (IV). The relative amounts of sterically hindered monomer (IV) (specifically monomer (V), and even more specifically monomer (VI)) and monomer (VIII) will therefore depend on the desired properties of the polycarbonate, the desired color, and like considerations.

In order to further maximize the color benefit obtained using sterically hindered monomers (IV), it is particularly beneficial to use monomers having low metal contents, especially alkaline metals such as sodium and potassium, alkaline earth metals such as calcium, metals such as aluminum, and transition metals such as manganese, iron, nickel, chromium, and zinc. In one embodiment, the alkali metal content of any given alkali metal (particularly sodium and potassium) in each monomer is less than 2 ppm, specifically less than 1 ppm, even more specifically less than 500 parts per billion (ppb), based on the parts by weight of each monomer. In another embodiment, the individual alkaline earth metal content of any given alkaline earth metal (e.g., calcium) in each monomer is less than 2 ppm, specifically less than 1 ppm, even more specifically less than 500 ppb based on the parts by weight of each monomer. In another embodiment, the individual metal content of any given metal (e.g., aluminum) in each monomer is less than 5 ppm, specifically less than 2 ppm, more specifically less than 1 ppm, even more specifically less than 500 ppb based on the parts by weight of each monomer. Still further, the individual transition metal content of any given transition metal (e.g., manganese, iron, nickel, chromium, and zinc) in each monomer is less than 2 ppm, specifically less than 1 ppm, even more specifically less than 500 ppb based on the parts by weight of each monomer. In still another embodiment the amount of iron in each monomer is less than 2 ppm, specifically less than 1 ppm, even more specifically less than 500 ppb based on the parts by weight of each monomer. Non-limiting methods for measuring trace levels of metals include inductively coupled plasma (ICP) atomic emission spectroscopy (AES), inductively coupled plasma (ICP) mass spectroscopy (MS), ion chromatography, electrochemical voltametric analysis, atomic absorption spectroscopy (AAS), and X-ray fluorescence. In a one embodiment, measurement of trace levels of metals occurs by using inductively coupled plasma atomic emission spectroscopy.

In another embodiment, the purity of each monomer is high, for example, greater than 99.7 wt. %, specifically greater than 99.8 wt. %. Specifically it is important to remove impurities that are colored or lead to the formation of color bodies. Purity can be determined by, for example, chromatographic methods such as gas chromatography (GC) and HPLC. In one embodiment, purity of each monomer is determined by HPLC.

In an additional embodiment, the color properties are further improved by pre-reacting the dihydroxy monoaryl monomers (II) and/or (III) with the activated carbonate in the presence of a transesterification catalyst, followed by adding the dihydroxy diaryl monomers (IV), (VIII) (if used), or other chain stoppers (if used). "Pre-reacting" as used herein means that the hydroxy functional groups in monomers (II) and/or (III) are reacted with the activated carbonate prior to addition of the diaryl monomers. In one embodiment, at least 25% of the hydroxyl groups in monomers (II) and/or (III) are converted, specifically at least 50%, and still more specifically at least 75% of the hydroxyl groups in monomers (II) and/or (III) are converted prior to the addition of the diaryl monomers.

The as-synthesized polycarbonates, typically in the form of an extruded pellet, can have excellent color prior to compounding with any additional components, determined in accordance with the CIE L*a*b* (CIE Lab) color classification detailed by CIE (Commission Internationale de l'Eclairage). The L* value represents the difference between light (L*=100) and dark (L*=0). The a* value represents the difference between green (−a*) and red (+a*), and the b* value represents the difference between yellow (+b*) and blue (−b*). The color properties of solid polymer samples can be measured by a spectrometer such as a spherically-based, 0/45 or 45/0, or multi-angle spectrophotometer or a colorimeter. The color values of the polycarbonate compositions can be measured using an Xrite Teleflash 130 instrument, specifically an Xrite Teleflash 130 instrument using the conditions described below. Specifically, the color values can be measured according to ASTM Designation E313-73 "Standard Test Method for Indexes of Whiteness and Yellowness of Near-White, Opaque Materials".

The CIE Lab L* value can be measured in a pelletized sample that is the as-synthesized product of the melt polymerization. The melt polymerized, as-synthesized polycarbonates manufactured using the above-described monomers can have an L* value of greater than or equal to 77 as measured in the pellets. Alternatively, or in addition, the melt polymerized, as-synthesized polycarbonates, manufactured using the above-described monomers can have a CIE Lab L* value that is at least 1 L* unit value higher and specifically at least 2 L* unit values higher than a comparable polycarbonate made by the same process in which the only difference is that monomer (IV) replaces some or all of bisphenol A, again, as measured in the pellets.

The color properties and color stability properties of the as-synthesized polycarbonate can be further improved by compounding the polycarbonate with a phosphorous-containing compound, specifically an acidic species such as $H_3PO_3$, or the corresponding hydrolytically unstable anhydride or ester thereof, as disclosed in US Patent Pub. 2008/0004379. The phosphorous-containing compound has at least one abstractable proton or a hydrolyzable group, for example, an ester, anhydride, amide, or halide. Exemplary acidic phosphorous-containing compounds can have the structure (IX):

$$R_xP-OH \tag{IX}$$

wherein each substituent R is independently (O=), hydrogen, $NH_4^+O^-$—, $M^+O^-$—, $M^{+2}(O^-)_2$, HO—, linear, branched or cyclic $C_{1-36}$ alkyl or alkoxy, substituted or unsubstituted $C_{6-36}$ phenyl, aryl, phenoxy, or $C_{7-36}$ aryloxy, linear, branched or cyclic $C_{1-36}$ alkyl phosphate ester or acid, substituted or unsubstituted $C_{6-36}$ aryl or $C_{7-36}$ alkylaryl phosphate ester or acid, linear, branched or cyclic $C_{1-36}$ alkyl phosphite ester or acid, or substituted or unsubstituted $C_{1-36}$ aryl or $C_{7-36}$ arylalkyl phosphite ester or acid, wherein x is 1 to 3, at most only one substituent can be (=O), $M^+$ is a monovalent metal ion or fragment of a metal ion complex or salt, $M^{+2}$ is a divalent metal ion or fragment of a metal ion complex or salt, and the sum of all integers x is equal to 3 if the substituent (=O) is present and equal to 2 if the substituent (=O) is absent.

The hydrogen in structure (IX) can be replaced by hydrolyzable groups. Specifically, the hydrogen can be replaced by a linear, branched, or cyclic $C_{1-36}$ alkyl, or non-ortho-substituted $C_{6-36}$ phenyl, aryl, or $C_{7-36}$ arylalkyl. More specifically, if the alkyl is branched, the branch point is located at least 2 carbons away from the oxygen and any branches will comprise not more than 1 to 3 carbon atoms. The hydrogens in $NH_4^+$ in formula (IX) formula can each be independently be replaced by $C_1$-$C_{12}$ hydrocarbyl groups. In one embodiment, the phosphorous-containing compound is a hydrolyzable phosphorus ester. The choice of the phosphorous containing compound and its hydrolyzable group will depend on the residence time and temperature and other conditions such as the use of an optional solvent for the color improvement process. In some embodiments, the phosphorous-containing compound can be non-sterically hindered and hydrolyzable phosphite or phosphate esters, amides, and anhydrides.

Non-limiting exemplary phosphorous-containing compounds are: dimethyl phosphinic acid (CAS 3283-12-3), dibutyl phosphinic acid, diphenyl phosphinic acid (CAS 1707-03-5), 2-methylphenyl(phenyl)phosphinic acid, 3,5-dimethylphenyl(phenyl)phosphinic acid (CAS 96331-30-5), 3-methoxyphenyl(phenyl)phosphinic acid (CAS 4552-91-4), 4-methoxyphenyl(phenyl)phosphinic acid (CAS 13118-95-1), 1-methylheptyl(phenyl)phosphinic acid (CAS 64308-50-5), 4-ethoxyphenyl(phenyl)phosphinic acid (CAS 96329-70-3), bis(4-methoxyphenyl)phosphinic acid (CAS 20434-05-3), dioctylphosphinic acid, bis(2,4,4-trimethylpentyl) phosphinic acid (CAS 27661-42-3), diammonium hydrogen phosphate, diphenyl phosphate, diphenyl phosphite, 4-(tert-pentyl)phenyl phosphate, (R)-(−)-1,1'-binaphthalene-2,2'-diyl hydrogen phosphate (CAS 39648-67-4), and di(2-ethylhexyl) phosphate, mono-zinc phosphate $Zn(H_2PO_4)_2$, phosphoric acid and phosphorus acid.

The amount of phosphorous-containing compound compounded with the polycarbonate is an amount sufficient to result in the desired degree of color improvement, and can be readily determined by one of ordinary skill in the art without undue experimentation. In some embodiments, the phosphorous-containing compound, specifically $H_3PO_3$, is present in an amount of 1 to 100 ppm, specifically 5 to 80 ppm, and more specifically 9 to 30 ppm, based on the parts by weight of the polycarbonate.

As used in the specification and claims herein, the term "compounding" refers to the intimate mixing of the polycarbonate and non-polycarbonate additives such as the phosphorous containing compound prior to preparation of a final product or article. Compounding is commonly performed by combining as-synthesized polycarbonate with the additive(s) and passing the mixture through an extruder to produce compounded pellets that can then be further processed, for example into shaped articles. The additive(s) can be combined with the as-synthesized melt polymerized polycarbonate prior to any pelletizing, or after pelletization of the as-synthesized polycarbonate.

Compounding can be performed either in a melt or in solution. In the melt, the polycarbonate and additives can be melt mixed or kneaded together in an extruder, melt kneader, reactor or other system or device capable of melting and mixing the polycarbonate and the additives, followed by extrusion or pelletization, or by direct melt processing into shaped articles. In solution processing, the polycarbonate and additive(s) are combined in an inert solvent and maintained together for sufficient reaction time and temperature to reduce the color of the composition. The solvent is then removed, for example using vacuum.

The temperature of the extruder in the foregoing methods will generally be the conventional extruder temperature used for forming pellets of a particular polycarbonate. The appropriate extruder temperature will depend on the properties of both the polycarbonate and the additives. Higher molecular weight polycarbonates and/or high heat polycarbonates containing monomer units that increase the glass transition temperature of the polycarbonate will typically require higher extruder temperatures, so that the melt viscosity is low enough for sufficient mixing with the additives to occur. Suitable temperature ranges are 275 to 375° C., specifically 300 to 340° C. One skilled in the art will understand that the temperature of the polymer melt can vary somewhat from the extruder temperature depending on the occurrence of exothermic and/or endothermic reactions and processes and any heat generated by the mechanical mixing of the molten polymer.

The compounding can be performed under reduced pressure, which will tend to assist in removal of byproducts, for example any salicylate byproducts arising from the use of BMSC. Reduced pressures can be in the range of 50 to 350 mbar (5 to 35 kiloPascal).

The melt polymerized, compounded polycarbonates can exhibit a CIE Lab L* value of greater than or equal to 79, specifically greater than or equal to 82, more specifically greater than or equal to 84, each as measured in the pellets. The melt-polymerized, compounded polycarbonate compositions can further have an L* value that is at least 1 L* unit value higher than the same melt polymerized, compounded polycarbonates manufactured by the same process except in which monomer (IV) is replaced by bisphenol A. As is known, polycarbonates are often compounded with various additional additives, for example those described in further detail below. The presence of such additives may or may not affect the L* value of the melt polymerized, compounded polycarbonates. It is to be understood that the foregoing improvement in the L* value of melt polymerized, compounded polycarbonates made using the monomers and methods as described herein is determined in the absence of any additives (other than the phosphorous-containing compounds described above) that would affect the L* value of the polycarbonates during compounding.

It has been found that the melt polymerized polycarbonates compounded with the phosphorus-containing compound can further have improved color stability, particularly when subjected to abusive or stringent molding conditions. Thus, the L* and b* values for a melt polymerized, compounded polycarbonate can be significantly improved under the abusive testing specified in the Examples herein, the improvement increasing with proportion of the monomer (IV) compared to any monomer (VIII) that is present. In one embodiment, the melt polymerized, compounded polycarbonates can exhibit a CIE Lab b* value of less than 5, specifically less than 3, as determined in an injection molded plaque sample subject to abusive molding, for example at a residence time of 720 seconds at a barrel temperature of 340° C., or as set forth in the Examples herein. In addition, the melt polymerized, compounded polycarbonates can have an L* value that is at least 1 L* unit value higher and a CIE Lab b* value that is at least 50% lower than the same composition in which monomer (IV) is replaced by bisphenol A, as determined in an injection molded plaque sample subject to abusive molding In addition, or in the alternative, melt polymerized, compounded polycarbonates can exhibit a CIE Lab a* value that has changed from a positive number to a negative number of lesser magnitude, as determined in an injection molded plaque sample subject to abusive molding, for example at a residence time of 720 seconds at a barrel temperature of 340° C., or as set forth in the Examples herein.

The melt compounded, as-synthesized or compounded polycarbonates can be used in the manufacture of polycarbonate compositions comprising various other components, including other polymers and additives ordinarily incorporated into polycarbonate compositions, with the proviso that the additives are selected so as to not significantly adversely affect the desired properties of the polycarbonate composition, in particular color and/or color stability. Mixtures of additives can be used. Such additives can be mixed at a suitable time during the mixing of the components for forming the composition.

Exemplary polymers that can be present include other polycarbonates. Such polycarbonates will generally be present in small amounts (0 to 10 wt. % of the total composition, specifically 1 to 5 wt. %), so as to not significantly adversely affect the color and color stability of the compositions. Exemplary additives include fillers, anti-oxidants, flame retardants, ant-drip agents, dyes, pigments, colorants, heat stabilizers, light stabilizers, fillers such as clay, mica, talc and glass fibers, antistatic agents, plasticizers, mold release agents, and lubricants. Effective amounts of the additives vary widely, but each (with the exception of fillers) is generally used in amounts from 0.001 to 10 wt. %, based on the total weight of the composition. A specific combination of additives is a light stabilizer, a heat stabilizer, and a mold release agent, in a total amount of less than 2 wt. %, specifically less than 1 wt. %, based on the total weight of the composition.

Thermoplastic compositions comprising the as-synthesized polycarbonate or compounded polycarbonate can be manufactured by methods generally available in the art, for example, in one embodiment, the as-synthesized or compounded polycarbonate and other components, including other polymers and/or optional additives are first blended, in a Henschel high speed mixer or other suitable mixer/blender. Other low shear processes including but not limited to hand mixing can also accomplish this blending. The blend can then fed into the throat of a twin-screw extruder via a hopper. Alternatively, one or more of the components can be incorporated into the composition by feeding directly into the extruder at the throat and/or downstream through a side-stuffer. Such additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Shaped, formed, or molded articles comprising the as-synthesized polycarbonate, the compounded polycarbonate, or the polycarbonate compositions are also provided. For example, the polycarbonates described herein can be used in the manufacture of molded articles or extruded films.

Molded articles can be obtained by a variety of means such as injection molding, rotational molding, or blow molding to form articles such as computer and business machine housings, such as housings for monitors, handheld electronic device housings such as housings for cell phones, electrical connectors, and components of lighting fixtures, ornaments, home appliances, roofs, greenhouses, sun rooms, swimming pool enclosures, electronic device casings, signs and the like. In addition, the polycarbonate compositions can be used for transportation applications such as automotive panel and trim. Examples include but are not limited to aircraft, automotive, truck, military vehicle (including automotive, aircraft, and water-borne vehicles), scooter, and motorcycle exterior and interior components, including panels, quarter panels, rocker panels, trim, fenders, doors, deck-lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards.

Additional fabrication operations on the articles can be used, for example additional molding, in-mold decoration, baking in a paint oven, lamination, and/or thermoforming.

The examples that follow are merely illustrative, and should not be construed limiting the scope of the claims.

EXAMPLES

Preparation of As-Synthesized Polycarbonate

This example illustrates preparation of a polycarbonate in a batch process. Melt polymerization was carried out in a reactor system in which an oligomerization vessel was charged at ambient temperature and pressure with hydroquinone, methyl hydroquinone, DMBPC, and bisphenol A; solid BMSC; and a solid monofunctional phenol chain stopper (para-cumylphenol (PCP)). The PCP chain stopper was added in amounts effective to yield approximately 50 mole % of PCP end groups at the targeted molecular weight. The amount of BMSC is 0.5 times the amount of added chain stopper. The catalysts tetramethyl ammonium hydroxide (TMAH) and sodium hydroxide (NaOH) were next added as an aqueous solution, in an amount of $25 \times 10^{-6}$ mole TMAH and 8 to $16 \times 10^{-6}$ mole NaOH per mole of diol. After this the oligomerization reactor was sealed shut. The system was deoxygenated by briefly evacuating the oligomerization reactor and then introducing nitrogen. This process was repeated three times.

The molten oligomer was then fed to a Werner & Pfleider ZSK-25 extruder by means of pump and feed line. The ZSK-25 extruder is a 25 mm diameter, twin screw, co-rotating, intermeshing extruder having a length to diameter ratio (LID) of about 59. The oligomer was fed to the extruder at a rate of about 12 to 14 kg/h, and the screw speed was about 300 rpm. The barrels of the extruder were set at 300° C., the die head at 310° C. The ZSK-25 extruder was equipped with a high and low vacuum system to remove the methyl salicylate formed as a byproduct in the polycondensation reaction. The low vacuum system consisted of a second line to, in series, a condenser, and holding tank, to which the reaction mixture was transported by means of a vacuum pump. A high vacuum system consisted of a third line, further along the extruder, to another condenser and vacuum pump and second holding tank. Two low vacuum vents were operated at a vacuum level of about 14 to 20 mbar, and the subsequent four high vacuum vents operated at a vacuum level of about 0.5 to 4 mbar. The apparatus is shown in US Pub. No. 2008/0004379.

The extruder was operated under the conditions of temperature, vacuum, residence time, and mixing intensity as described above, which are sufficient to promote polymerization. In these examples, BPA and DMBPC monomers have the metal impurity levels shown in Table 1, as measured by ICP analysis.

TABLE 1

| Monomer | Na ppb | Mn ppb | Al ppb | Ca ppb | Fe ppb | Ni ppb | Zn ppb | Cr ppb | K ppb |
|---|---|---|---|---|---|---|---|---|---|
| BPA | 391 | <10 | 86 | 122 | 441 | <10 | 117 | <10 | 363 |
| DMBPC | 484 | 20 | >2000 | 360 | 419 | 105 | 171 | 35 | 246 |

The as-synthesized polycarbonates were tested for color using a XRITE TELEFLASH 130 instrument. This instrument allows direct measurement of pellet color, eliminating the need for additional processing steps such as molding, which can cause the color to change A standard light source D65 (neutral daylight, 6500 Kelvin) with a 10° observation angle was used to generate CIE Lab L, a*, and b* values. The pellets were placed in a glass Petri dish with a diameter of 15 cm and a height of 4 cm. The dish was completely filled with pellets, excess pellets were removed, and the surface pellets gently compressed. Next, the filled dish was placed at a fixed distance and angle from the instrument light source and detector. Each sample was measured three times in three different dish positions whereby the dish was rotated between each position. The results are shown in Table 3.

Preparation of Compounded Polycarbonates

Polycarbonates A, B and C were compounded with phosphorous acid ($H_3PO_3$) as the stabilizer. In particular, polycarbonates A, B, and C were compounded on a Werner & Pfleider ZSK25 twin-screw extruder. Phosphoric acid was manually premixed with an interfacially-prepared bisphenol A homopolycarbonate powder (in all cases 5 wt. % of interfacially-prepared polycarbonate powder is used to mix the additives) and further homogenized using a shaking device. This polycarbonate premix was then fed to the extruder together with polycarbonate A, B, or C in a 1:19 ratio of premix:as-synthesized polycarbonate. Phosphorous acid ($H_3PO_3$) was added to the polycarbonate samples in an amount that was five times the molar concentration of the catalyst in each sample. For example, to polycarbonate A an amount of 18.22 ppm was added, to polycarbonate B an amount of 16.19 ppm was added, and to polycarbonate C an amount of 17.55 ppm was added, based on the weight of polycarbonates A, B and C, respectively. The barrel temperature of the extruder was set at 300° C. while a vacuum in the range of 150 to 350 mbar was applied. The extruded polymer strands were briefly cooled by passing them through a water bath and finally pelletized. The color of the pellets was measured as described above. The results are shown in Table 3.

Molding of As-Synthesized and Compounded Polycarbonates

Test specimens (60 mm×60 mm×2.5 mm plaques) of the as-synthesized and compounded polycarbonates were molded. The pellets were dried before molding at 105° C. for 3 hours. In order to determine color stability, two molding conditions were used, "standard" ("STD") and "abusive" (ABU). The conditions applied on an Engel 45 Tons molding machine are shown in Table 2.

TABLE 2

| | Molding Condition | |
|---|---|---|
| | STD | ABU |
| Predry temperature (° C.) | 105 | 105 |
| Predry time (hours) | 3 | 3 |
| Temp. Hopper (° C.) | 40 | 40 |
| Temp. Zone 1 (° C.) | 280 | 320 |
| Temp. Zone 2 (° C.) | 290 | 330 |
| Temp. Zone 3 (° C.) | 300 | 340 |
| Temp. Nozzle (° C.) | 295 | 335 |
| Temp. Mold (° C.) | 90 | 90 |
| Holding time (sec.) | 10 | 10 |
| Cooling time (sec.) | 20 | 128 |
| Cycle time (sec.) | 36 | 144 |
| Residence time (sec.) | 180 | 720 |

The test specimens were then evaluated for color using a Gretag-MacBeth 7000A spectrometer according to the CIE laboratory standard (CIE Lab). A D65 light source was used with a 10° observation angle. The results are shown in Table 3.

TABLE 3

| | Composition, mole % | | | | | ppm | | Pellet color as-synthesized | | | Pellet color Compounded | | | Plaque color After STD molding | | |
|---|---|---|---|---|---|---|---|---|---|---|---|---|---|---|---|---|
| Ex. | HQ | MeHQ | BPA | DMBPC | TMBPA | (1) | $H_3PO_3$ | L* | a* | b* | L* | a* | b* | L* | a* | b* |
| 1a* | 34 | 33 | 33 | — | — | N | — | 80.9 | 2.6 | 14.6 | — | — | — | 94.2 | 0.24 | 3.8 |
| 2a | 34 | 33 | 23 | 10 | — | N | — | 82.2 | 2.9 | 14.0 | — | — | — | 94.9 | 0.16 | 3.1 |
| 3a | 34 | 33 | — | 33 | — | N | — | 84.1 | 1.7 | 15.7 | — | — | — | 95.0 | −0.09 | 3.3 |
| 1b* | 34 | 33 | 33 | — | — | Y | 18.2 | — | — | — | 80.0 | 1.26 | 16.4 | 94.6 | −0.19 | 3.3 |
| 2b | 34 | 33 | 23 | 10 | — | Y | 17.6 | — | — | — | 85.2 | 0.32 | 15.4 | 95.2 | −0.17 | 2.4 |
| 3b | 34 | 33 | — | 33 | — | Y | 16.2 | — | — | — | 84.4 | 0.07 | 16.1 | 95.3 | −0.20 | 2.3 |
| 4a | 34 | 33 | — | — | 33 | N | — | 78.9 | 4.3 | 23.3 | — | — | — | 93.6 | 0.07 | 7.1 |
| 5a | 34 | 33 | 10 | — | 23 | N | — | 78.8 | 4.4 | 25.8 | — | — | — | 93.6 | 0.04 | 6.9 |
| 1c* | 34 | 33 | 33 | — | — | N | — | 78.0 | 4.3 | 25.1 | — | — | — | 93.7 | −0.13 | 6.6 |
| 4b | 34 | 33 | — | — | 33 | Y | 28.1 | — | — | — | 80.5 | 2.91 | 24.7 | 94.9 | −0.33 | 4.2 |
| 5b | 34 | 33 | 10 | — | 23 | Y | 27.2 | — | — | — | 80.9 | 2.58 | 25.8 | 94.9 | 0.49 | 4.7 |
| 1d* | 34 | 33 | 33 | — | — | Y | 29.6 | — | — | — | 81.8 | 1.8 | 23.9 | 95.0 | −0.46 | 4.0 |
| 1e | 34 | 33 | 33 | — | — | N | — | 79.0 | 4.0 | 24.0 | — | — | — | 93.9 | −0.07 | 5.8 |

TABLE 3-continued

| | | | | | | | | | | | | | | | |
|---|---|---|---|---|---|---|---|---|---|---|---|---|---|---|---|
| 3c | 34 | 33 | — | 33 | — | N | — | 82.3 | 2.6 | 22.4 | — | — | — | 94.6 | −0.21 5.0 |
| 1f* | 34 | 33 | 33 | — | — | Y | 22.8 | — | — | — | 82.7 | 1.55 | 22.4 | 95.0 | −0.39 3.6 |
| 3d | 34 | 33 | — | 33 | — | Y | 20.2 | — | — | — | 84.2 | 0.58 | 19.7 | 95.3 | −0.26 2.7 |

| Ex. | Plaque color After ABU molding | | | Pellet color change with compounding | | | | Plaque color change after molding | | | |
|---|---|---|---|---|---|---|---|---|---|---|---|
| | L* | a* | b* | DL* | Da* | Db* | dE | DL* | Da* | Db* | dE |
| 1a* | 90.6 | 1.0 | 11.1 | — | — | — | — | −3.6 | 0.8 | 7.3 | 8.2 |
| 2a | 92.4 | −0.3 | 10.1 | — | — | — | — | −2.5 | −0.4 | 7.0 | 7.4 |
| 3a | 93.0 | −0.7 | 10.3 | — | — | — | — | −2.0 | −0.6 | 7.0 | 7.3 |
| 1b* | 93.1 | 0.6 | 6.3 | −1.1 | −1.30 | 1.8 | 2.5 | −1.5 | 0.8 | 2.9 | 3.4 |
| 2b | 95.1 | −0.1 | 2.7 | 3.1 | −2.56 | 1.5 | 4.2 | −0.2 | 0.0 | 0.4 | 0.4 |
| 3b | 95.2 | −0.2 | 2.8 | 0.3 | −1.64 | 0.4 | 1.7 | −0.1 | 0.0 | 0.5 | 0.5 |
| 4a | 90.1 | 0.0 | 14.9 | — | — | — | — | −3.5 | −0.1 | 7.8 | 8.6 |
| 5a | 89.9 | 0.1 | 14.0 | — | — | — | — | −3.7 | 0.1 | 7.1 | 8.0 |
| 1c* | 89.5 | 1.3 | 13.5 | — | — | — | — | −4.2 | 1.4 | 6.9 | 8.2 |
| 4b | 94.4 | −0.2 | 4.8 | 1.6 | −1.43 | 1.4 | 2.6 | −0.5 | 0.1 | 0.5 | 0.7 |
| 5b | 94.5 | −0.4 | 5.3 | 2.1 | −1.8 | −0.1 | 2.8 | −0.4 | 0.1 | 0.6 | 0.8 |
| 1d* | 94.8 | −0.5 | 4.3 | 3.8 | −2.54 | −1.3 | 4.7 | −0.2 | 0.0 | 0.4 | 0.4 |
| 1e | 89.9 | 1.29 | 12.4 | — | — | — | — | −4.0 | 1.4 | 6.6 | 7.8 |
| 3c | 92.3 | −0.9 | 12.8 | — | — | — | — | −2.3 | −0.7 | 7.7 | 8.1 |
| 1f* | 94.8 | −0.4 | 3.8 | 3.7 | −2.47 | −1.7 | 4.8 | −0.2 | 0.0 | 0.3 | 0.3 |
| 3d | 95.2 | −0.3 | 2.9 | 1.9 | −2.05 | −2.7 | 3.9 | −0.1 | 0.0 | 0.2 | 0.2 |

(1) Composition compounded - yes (Y)/no (N)

As shown in Table 3, the color results of the as-synthesized polycarbonate pellets (Exs. 1a, 2a, and 3a) display two trends: in general, the higher the content of DMBPC, the lower the a* value; and the higher the content DMBPC, the higher the L* value. In general the higher the L* value, the less color the sample possesses.

Further as shown in Table 3, the color results of the compounded polycarbonate pellets (Exs. 1b, 2b, and 3b) demonstrate that increasing the amount of DMBPC in the polycarbonates results in lowering of the a* value. Further, the absolute a* color values are lower compared to the uncompounded examples. Thus, use of a phosphorus-containing additive such as $H_3PO_3$ can further reduce the a* value during a compounding step. The presence of DMBPC in the compounded examples further increases the L* value of the samples.

The color results for molded samples with no compounding (Exs. 1a, 2a, and 3a) show that under both the standard and abusive molding conditions, increasing the amount of DMBPC in the polycarbonates results in the a* value decreasing and the L* value increasing. The color results for molded samples with compounding (Exs. 1b, 2b, and 3b) shows that the samples containing DMBPC have a clear improvement in color value L* and b*. Furthermore, these examples show that use of DMBPC provides enhanced color stabilization in the polycarbonates, as the samples containing DMBPC gain less color during the abusive molding step.

Examples 4a, 5a, 4b, and 5b show similar trends when TMBPA is used as the sterically-hindered dihydroxy diaryl compound instead of DMBPC. For example, the L* value of the as-synthesized samples is higher than that of the reference polymer not containing any sterically-hindered dihydroxy diaryl compound (e.g., Ex. 1c). These examples also show that color can be improved by compounding the compositions containing TMBPA with acid. For example, the L* value increases and the a* value decreases when these compositions are compounded (e.g., Exs. 4b versus 4a and Exs. 5b versus 5a). In the case of the abusively molded samples, the L* value is higher and the a* value is lower for the compositions containing TMBPA but without acid, versus that of the composition based on BPA without acid (e.g. Exs. 4a and 5a versus Ex. 1c).

It is to be noted that that the improved color observed when DMBPC is used in place of BPA in these examples is not a result of a lower concentration of metal contaminants in DMBPC versus BPA. The metal levels of the two monomers are shown to be comparable, and the metal levels in DMBPC are actually even slightly higher than those in BPA (data not shown).

The singular forms "a," "an," and "the" include plural referents unless the context clearly dictates otherwise. Unless defined otherwise, technical and scientific terms used herein have the same meaning as is commonly understood by one of skill in the art to which this invention belongs. In case of inconsistencies, the present disclosure prevails. The endpoints of all ranges directed to the same component or property are inclusive of the recited endpoint and are independently combinable. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" refers broadly to a substituent comprising carbon and hydrogen, optionally with at least one heteroatoms, for example, oxygen, nitrogen, halogen, or sulfur; "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

All cited patents, patent applications, and other references are incorporated herein by reference in their entirety.

While typical embodiments have been set forth for the purpose of illustration, the foregoing descriptions should not be deemed to be a limitation on the scope herein.

What is claimed is:

1. A melt polymerized polycarbonate comprising repeat units derived from the melt polymerization of monomers (II), (IV), and optionally (VIII), or from the melt polymerization of monomers (III), (IV), and optionally (VIII), or from the melt polymerization of monomers (II), (III), (IV), and optionally (VIII), wherein monomer (II) is a first dihydroxy compound of structure (II):

wherein n is 0 to 4, and each $R^{f1}$ is independently a halogen, a $C_{1-12}$ hydrocarbyl group, or a $C_{1-12}$ halogen substituted hydrocarbyl group;

monomer (III) is a second dihydroxy compound not the same as monomer (II) and of structure (III):

wherein m is 1 to 4, and $R^{f2}$ is independently a halogen, a $C_{1-12}$ hydrocarbyl group, or a $C_{1-12}$ halogen substituted hydrocarbyl group;

monomer (IV) is a third dihydroxy compound of structure (IV):

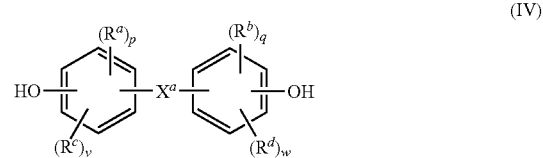

wherein $R^a$ and $R^b$ are each independently a halogen or $C_{1-12}$ hydrocarbyl group that is meta to the hydroxy group on the same aromatic ring; $R^c$ and $R^d$ are each independently a halogen or a $C_1$-$C_{12}$ hydrocarbyl group that is ortho to the hydroxy group on the same aromatic ring; p and q are each independently 0 to 2; v and w are each independently 1 or 2; and $X^a$ is a single bond or a $C_{1-18}$ organic bridging group connecting the two hydroxy-substituted aromatic groups; and monomer (VIII) is a fourth dihydroxy compound of structure (VIII):

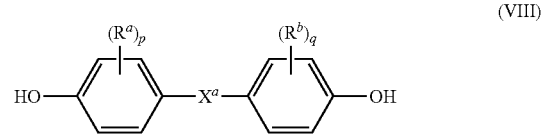

wherein $R^a$ and $R^b$ are each independently a halogen or $C_{1-12}$ hydrocarbyl group that is meta to the hydroxy group on the same aromatic ring; p and q are each independently integers of 0 to 2; and $X^a$ is a single bond or a $C_{1-18}$ organic group connecting the two hydroxy-substituted aromatic group;

wherein the mole ratio of repeat units in the polycarbonate derived from monomers [(II)+(III)]:(IV):(VIII) is 15-70:1-85:0-50, the sum of the mole percent of repeat units in the polycarbonate derived from monomers [(II)+(III)]+(IV) is greater than or equal to 50 mole %, and the sum of the mole percent of units in the polycarbonate derived from monomers [(II)+(III)]+(IV)+(VIII) is 100 mole %; and wherein the polycarbonate has an L* value that is at least 1 L* unit value higher than the same polycarbonate in which monomer (IV) is replaced by bisphenol A.

2. The polycarbonate of claim 1, wherein a pelletized sample of the melt polymerized polycarbonate, without compounding, exhibits a CIE Lab L* value of greater than or equal to 77.

3. The polycarbonate of claim 1, wherein after compounding with a phosphorus-containing compound, the compounded polycarbonate exhibits a CIE Lab L* value of greater than or equal to 79.

4. The polycarbonate of claim 3, wherein the phosphorus-containing compound is a phosphorous-containing acid or the corresponding hydrolytically unstable anhydride or ester.

5. The polycarbonate of claim 3, wherein an injection molded sample subject to abusive molding at a residence time of 720 seconds and a barrel temperature of 340° C., has lower CIE Lab a* value than the same sample that has not been compounded.

6. The polycarbonate of claim 1 wherein, in monomer (IV), p and q are each 0, $R^c$ and $R^d$ are each independently a halogen or a $C_{1-4}$ alkyl group, and $X^a$ is a $C_{1-9}$ alkylidene or cycloalkylidene group.

7. The polycarbonate of claim 1, wherein the monomer (IV) is a bisphenol cyclohexylidene of structure (V):

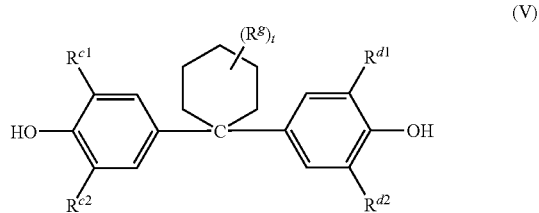

(V)

wherein $R^{c1}$ and $R^{d1}$ are each independently $C_{1-12}$ alkyl, $R^{c2}$ and $R^{d2}$ are each independently hydrogen or $C_{1-12}$ alkyl, Rg is $C_{1-12}$ alkyl or halogen, and t is 0 to 10.

8. The polycarbonate of claim 1, wherein the monomer (IV) is of structure (VII):

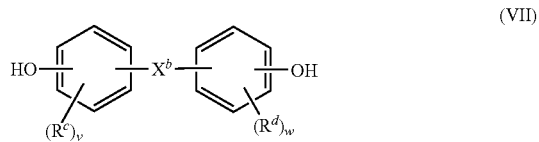

(VII)

wherein $R^c$ and $R^d$ are each independently a halogen or $C_{1-10}$ alkyl group that is ortho to the hydroxy group on the same aromatic ring; v and w are each independently integers of 1 to 2; and the bridging group $X^b$ is a single bond or a $C_{1-9}$ alkylidene of formula —C(R$^j$)(R$^k$)— wherein R$^j$ and R$^k$ are each independently hydrogen, $C_{1-4}$ alkyl, or $C_{1-4}$ perfluoroalkyl.

9. The polycarbonate of claim 1 wherein the mole ratio of repeat units in the polycarbonate derived from monomers [(II)+(III)]:(IV):(VIII) is 30-70:1-70:0-50.

10. The polycarbonate of claim 1 wherein the mole ratio of repeat units in the polycarbonate derived from monomers [(II)+(III)]:(IV):(VIII) is 15-70:30-85:0, and the mole % of repeat units in the polycarbonate derived from one of monomers (II) and (III) can be 0.

11. The polycarbonate of claim 1 wherein the mole ratio of repeat units in the polycarbonate derived from monomer [(II)+(III)]:(IV):(VIII) is 45-70:30-55:0, and the mole % of repeat units in the polycarbonate derived from one of monomers (II) and (III) can be 0.

12. The polycarbonate of claim 1, wherein monomer (II) is hydroquinone, monomer (III) is methyl hydroquinone, and monomer (IV) is dimethyl bisphenol cyclohexane.

13. The polycarbonate of claim 1, wherein monomer (II) is hydroquinone, monomer (III) is methyl hydroquinone, and monomer (IV) is an ortho-alkyl substituted bisphenol A, wherein the alkyl group has from 1 to 12 carbon atoms.

14. The polycarbonate of claim 1, wherein monomer (II) is hydroquinone, monomer (III) is methyl hydroquinone, and monomer (IV) is an ortho-t-butyl substituted bisphenol A, wherein the alkyl group has from 1 to 12 carbon atoms.

15. The polycarbonate of claim 1 wherein the polycarbonate further comprises a repeat unit that is derived from the fourth dihydroxy compound of formula (VIII).

16. The polycarbonate of claim 14 wherein the mole ratio of repeat units in the polycarbonate derived from monomers [(II)+(III)]:(IV):(VIII) is 30-70:1-69:1-50, and the mole % of repeat units in the polycarbonate derived from one of monomers (II) and (III) can be 0.

17. The polycarbonate of claim 2, wherein monomer (II) is hydroquinone, monomer (III) is methyl hydroquinone, monomer (IV) is dimethyl bisphenol cyclohexane, and monomer (VIII) is bisphenol A.

18. A process for the manufacture of the melt polymerized polycarbonate of claim 1, comprising
melt polymerizing a monomer composition comprising monomers (II), (IV), and optionally (VIII), or comprising monomers (III), (IV), and optionally (VIII), or comprising monomers (II), (III), (IV), and optionally (VIII) with an activated carbonate, in the presence of a transesterification catalyst to form the melt polymerized polycarbonate.

19. The method of claim 18, wherein the monomer composition further comprises monomer (VIII), wherein $R^a$ and $R^b$ are each independently a $C_{1-3}$ alkyl group that is meta to the hydroxy group on the same aromatic ring; p and q are each independently integers of 0 to 1; and $X^a$ is $X^a$ is a $C_{1-18}$ alkyl group connecting the two hydroxy-substituted aromatic group.

20. A process for the manufacture of the compounded, melt polymerized polycarbonate of claim 3, comprising
melt polymerizing a monomer composition comprising monomers (II), (IV), and optionally (VIII), or comprising monomers (III), (IV), and optionally (VIII), or comprising monomers (II), (III), (IV), and optionally (VIII) with an activated carbonate, in the presence of a transesterification catalyst to form the melt polymerized polycarbonate; and
compounding the melt-polymerized polycarbonate with a phosphorus-containing compound to form the compounded, melt polymerized polycarbonate.

21. The method of claim 20, wherein the monomer composition further comprises monomer (VIII), wherein $R^a$ and $R^b$ are each independently a $C_{1-3}$ alkyl group that is meta to the hydroxy group on the same aromatic ring; p and q are each independently integers of 0 to 1; and $X^a$ is $X^a$ is a $C_{1-18}$ alkyl group connecting the two hydroxy-substituted aromatic group.

22. An article comprising the polycarbonate of claim 1.

23. An article comprising the polycarbonate of claim 3.

24. A melt polymerized polycarbonate comprising repeat units derived from the melt polymerization of monomers (II), (IV), and optionally (VIII), or from the melt polymerization of monomers (III), (IV), and optionally (VIII), or from the melt polymerization of monomers (II), (III), (IV), and optionally (VIII), wherein
monomer (II) is a first dihydroxy compound of structure (II):

(II)

wherein n is 0 to 4, and each $R^{f1}$ is independently a halogen, a $C_{1-12}$ hydrocarbyl group, or a $C_{1-12}$ halogen substituted hydrocarbyl group;

monomer (III) is a second dihydroxy compound not the same as monomer (II) and of structure (III):

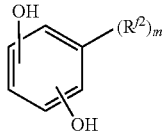

(III)

wherein m is 1 to 4, and $R^{f2}$ is independently a halogen, a $C_{1-12}$ hydrocarbyl group, or a $C_{1-12}$ halogen substituted hydrocarbyl group;

monomer (IV) is a bisphenol cyclohexylidene of structure (V):

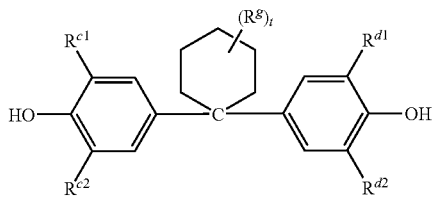

(V)

wherein $R^{c1}$ and $R^{d1}$ are each independently $C_{1-12}$ alkyl, $R^{c2}$ and $R^{d2}$ are each independently hydrogen or $C_{1-12}$ alkyl, Rg is $C_{1-12}$ alkyl or halogen, and t is 0 to 10; and monomer (VIII) is a fourth dihydroxy compound of structure (VIII):

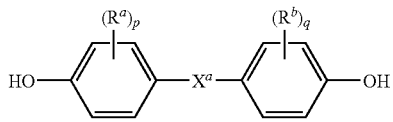

(VIII)

wherein $R^a$ and $R^b$ are each independently a halogen or $C_{1-12}$ hydrocarbyl group that is meta to the hydroxy group on the same aromatic ring; p and q are each independently integers of 0 to 2; and $X^a$ is a single bond or a $C_{1-18}$ organic group connecting the two hydroxy-substituted aromatic group;

wherein the mole ratio of repeat units in the polycarbonate derived from monomers [(II)+(III)]:(IV):(VIII) is 15-70:1-85:0-50, the sum of the mole percent of repeat units in the polycarbonate derived from monomers [(II)+(III)]+(IV) is greater than or equal to 50 mole %, and the sum of the mole percent of units in the polycarbonate derived from monomers [(II)+(III)]+(IV)+(VIII) is 100 mole %; and wherein the polycarbonate has an L* value that is at least 1 L* unit value higher than the same polycarbonate in which monomer (IV) is replaced by bisphenol A.

25. The polycarbonate of claim 24, wherein after compounding with a phosphorus-containing acid or the corresponding hydrolytically unstable anhydride or ester, the compounded polycarbonate exhibits a CIE Lab L* value of greater than or equal to 79.

26. A melt polymerized polycarbonate comprising repeat units derived from the melt polymerization of monomers (II), (IV), and (VIII), or from the melt polymerization of monomers (III), (IV), and (VIII), or from the melt polymerization of monomers (II), (III), (IV), and (VIII), wherein monomer (II) is a first dihydroxy compound of structure (II):

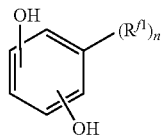

(II)

wherein n is 0 to 4, and each $R^{f1}$ is independently a halogen, a $C_{1-12}$ hydrocarbyl group, or a $C_{1-12}$ halogen substituted hydrocarbyl group;

monomer (III) is a second dihydroxy compound not the same as monomer (II) and of structure (III):

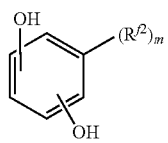

(III)

wherein m is 1 to 4, and $R^{f2}$ is independently a halogen, a $C_{1-12}$ hydrocarbyl group, or a $C_{1-12}$ halogen substituted hydrocarbyl group;

monomer (IV) is a third dihydroxy compound of structure (IV):

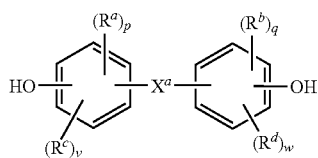

(IV)

wherein $R^a$ and $R^b$ are each independently a halogen or $C_{1-12}$ hydrocarbyl group that is meta to the hydroxy group on the same aromatic ring; $R^c$ and $R^d$ are each independently a halogen or a $C_1$-$C_{12}$ hydrocarbyl group that is ortho to the hydroxy group on the same aromatic ring; p and q are each independently 0 to 2; v and w are each independently 1 or 2; and $X^a$ is a single bond or a $C_{1-18}$ organic bridging group connecting the two hydroxy-substituted aromatic groups; and monomer (VIII) is a fourth dihydroxy compound of structure (VIII):

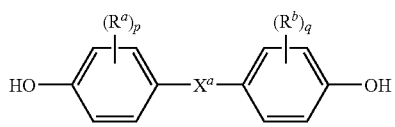

(VIII)

wherein $R^a$ and $R^b$ are each independently a halogen or $C_{1-12}$ hydrocarbyl group that is meta to the hydroxy group on the same aromatic ring; p and q are each independently integers of 0 to 2; and $X^a$ is a single bond or a $C_{1-18}$ organic group connecting the two hydroxy-substituted aromatic group;

wherein
the mole ratio of repeat units in the polycarbonate derived from monomers [(II)+(III)]:(IV):(VIII) is 15-70:1-85:0-50,
the sum of the mole percent of repeat units in the polycarbonate derived from monomers [(II)+(III)]+(IV) is greater than or equal to 50 mole %, and
the sum of the mole percent of units in the polycarbonate derived from monomers [(II)+(III)]+(IV)+(VIII) is 100 mole %; and
wherein the polycarbonate has an L* value that is at least 1 L* unit value higher than the same polycarbonate in which monomer (IV) is replaced by bisphenol A.

27. The polycarbonate of claim 26, wherein after compounding with a phosphorus-containing acid or the corresponding hydrolytically unstable anhydride or ester, the compounded polycarbonate exhibits a CIE Lab L* value of greater than or equal to 79.

* * * * *